June 23, 1931. T. H. KANE 1,811,585
WIRE WELDING MACHINE
Filed July 19, 1922 5 Sheets-Sheet 1

Inventor
Thomas H. Kane
By Marks & Clerk
Attorneys.

Figure 1:
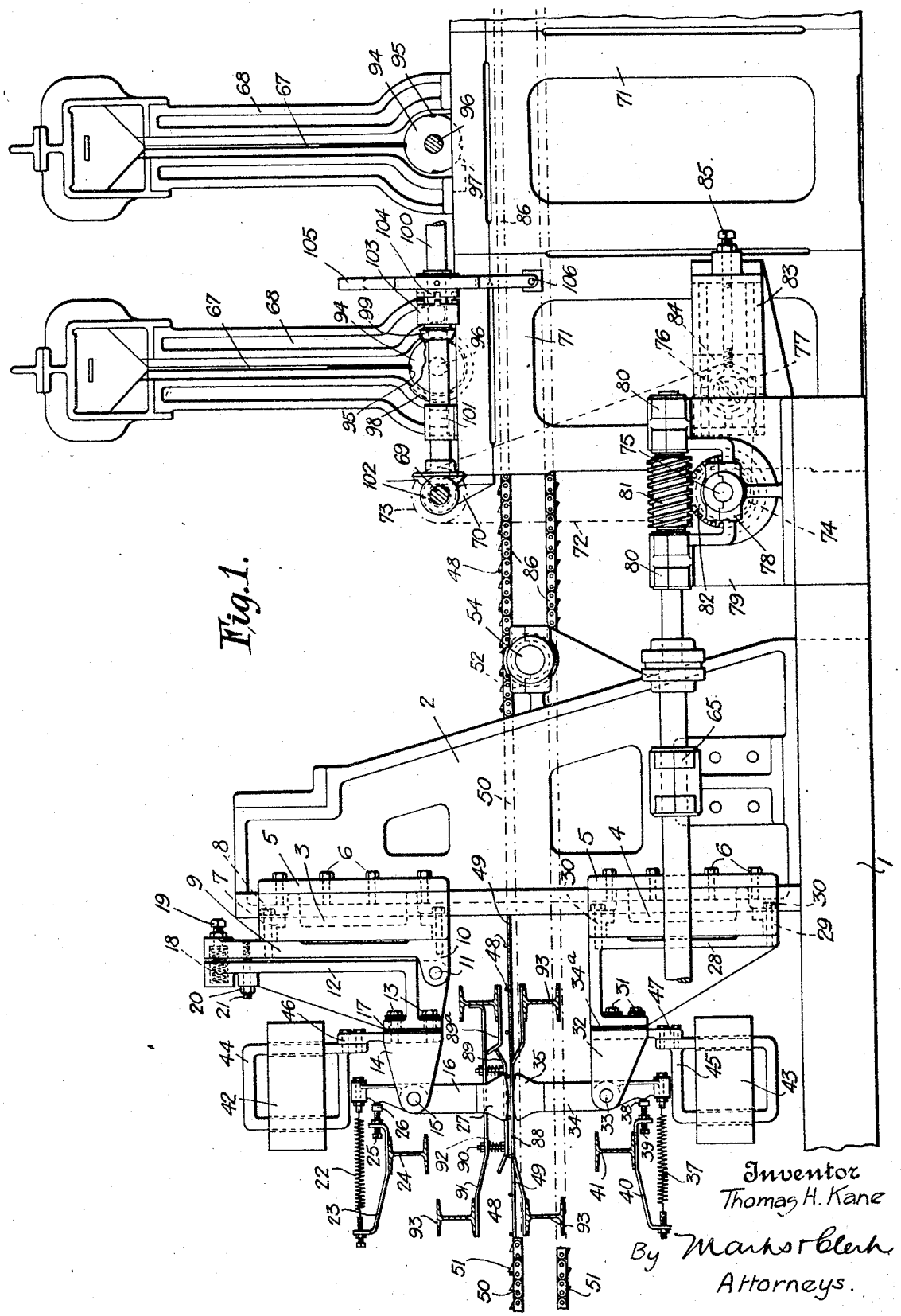

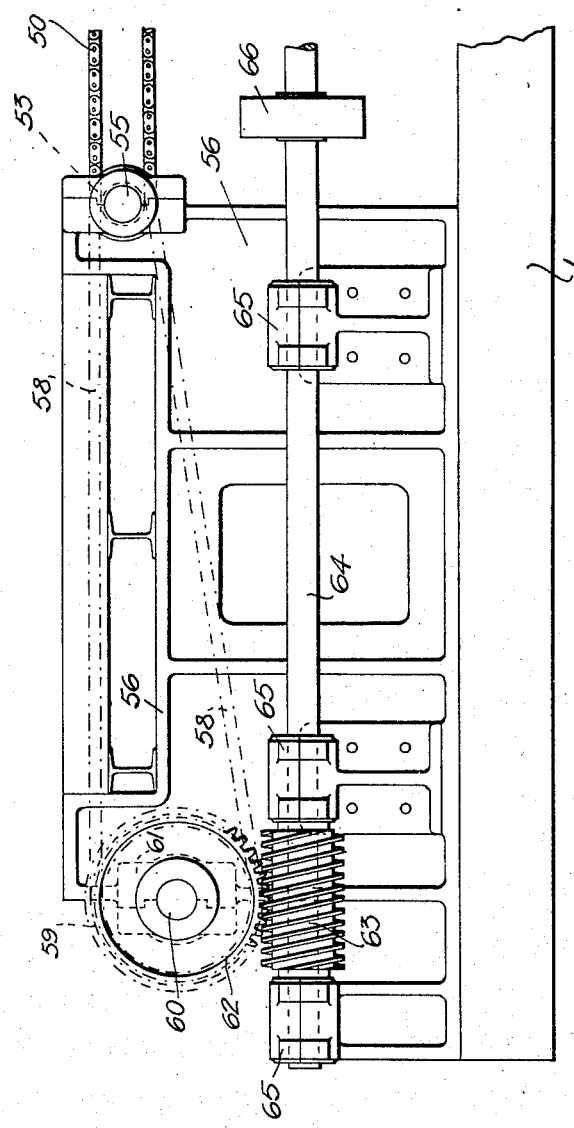
Fig. 1ª

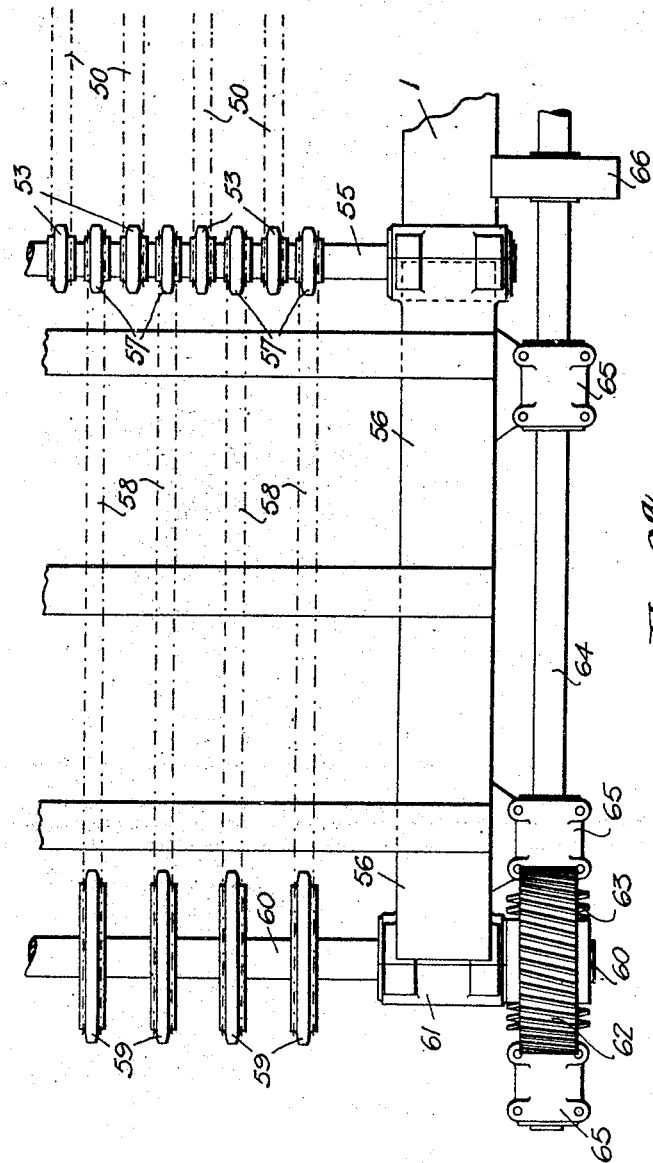

June 23, 1931. T. H. KANE 1,811,585
WIRE WELDING MACHINE
Filed July 19, 1922  5 Sheets-Sheet 5

Inventor
Thomas H. Kane.
By Attorneys
Marks Clerk

Patented June 23, 1931

1,811,585

UNITED STATES PATENT OFFICE

THOMAS HENRY KANE, OF YOUNGSTOWN, OHIO, ASSIGNOR TO TRUSCON STEEL COMPANY, OF YOUNGSTOWN, OHIO, A CORPORATION OF MICHIGAN

WIRE WELDING MACHINE

Application filed July 19, 1922. Serial No. 575,943.

This invention relates to a machine for welding together a series of longitudinal wires and a succession of cross wires in order to produce a wire meshwork or fabric.

The objects of the invention are to provide a machine which is relatively simple in construction, as compared with prior machines, and in which a common feeding means is provided for feeding both the longitudinal wires and the cross wires past the welding electrodes; in which the welding electrodes are mounted to travel with the crossed wires during the welding operation in order to maintain an effective heating of and welding pressure upon said wires; and in which provision is made for operating the electrodes so that successive cross wires engage the electrode surfaces at different places in order to distribute the wear on the electrodes.

With these and other objects in view, the invention consists in the features and combinations and arrangements of parts which will be more fully described and clearly pointed out in the appended claims.

The invention is illustrated in one embodiment thereof in the accompanying drawings, in which:—

Figure 2:
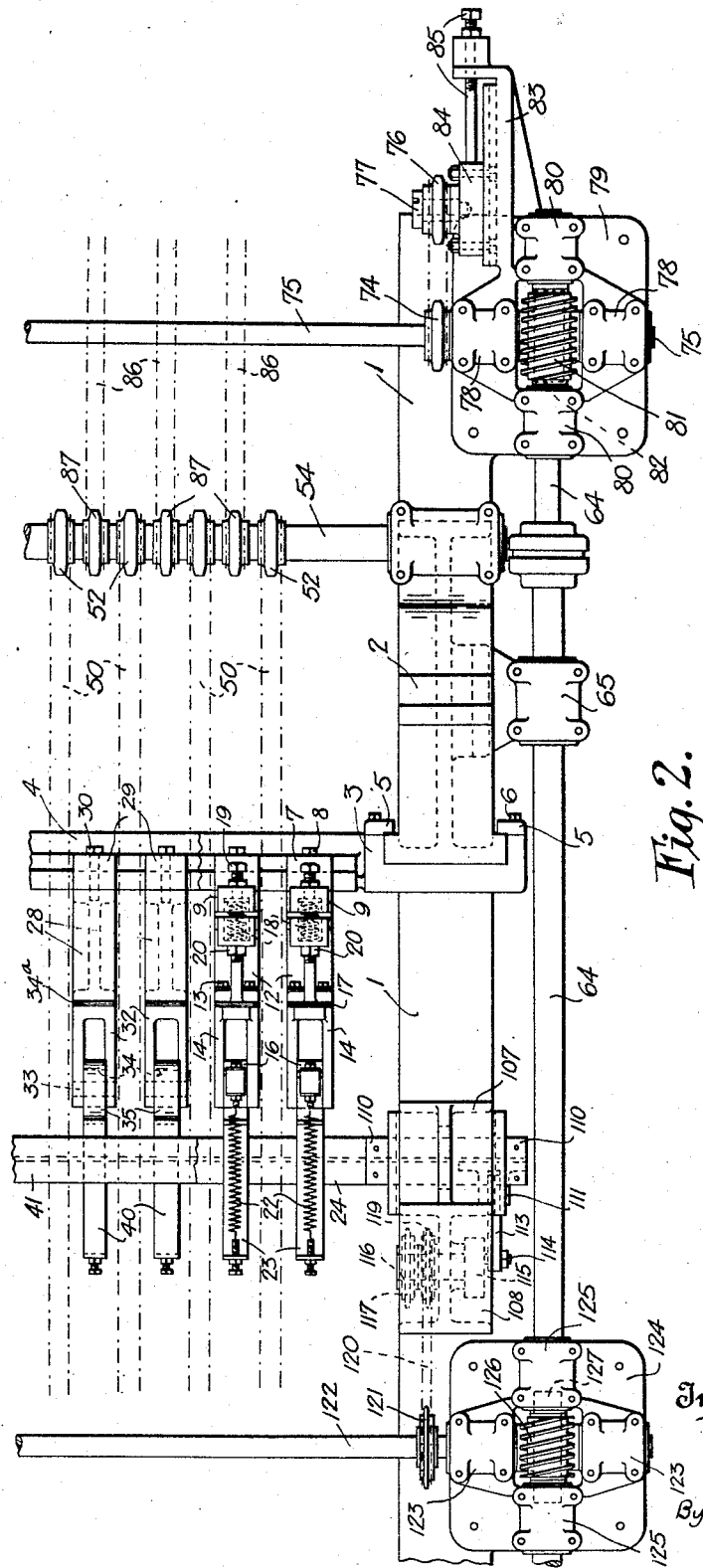
Figure 3:
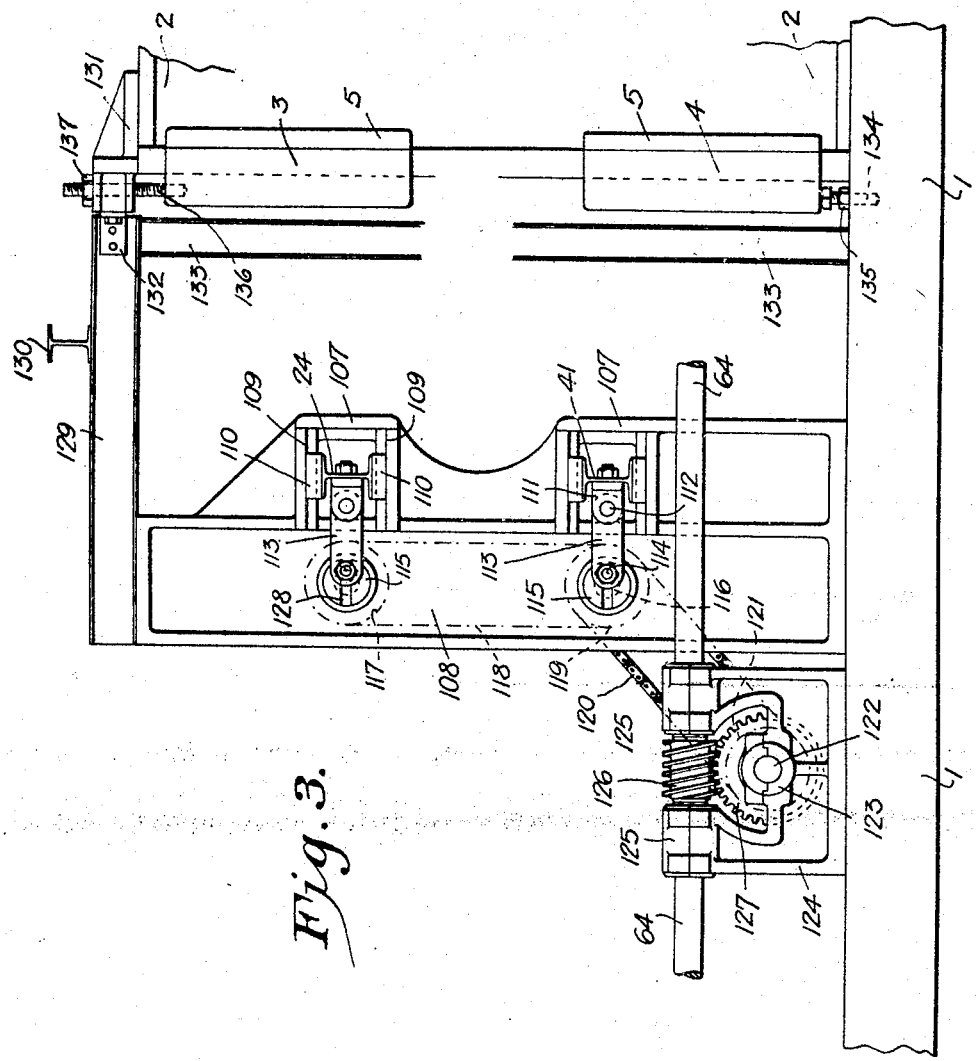

Figures 1 and 1ª taken together show a side elevation of the machine, partly in section, Figures 2 and 2ª taken together show a plan view of the machine, certain parts being omitted to more clearly show other parts, and Figure 3 is a side elevation of the mechanism for shifting the electrodes to distribute the wear thereon.

The machine selected for the purpose of illustrating the invention comprises a framework including the base or bed plates 1 upon which are mounted at opposite sides of the machine and adjacent one end of said base a pair of vertical side frames 2. Extending transversely across the machine are the upper cross rail 3 and the lower cross rail 4, each of these rails at each end thereof fitting around the vertical face of the corresponding side frame 2 and being securely clamped or fixed thereto by means of strips 5 and studs 6. The cross rails may of course be secured to the side frames in any other suitable manner. The upper cross rail 3 serves to support the upper electrode brackets and the lower cross rail 4 serves to support the lower electrode brackets, there being one bracket for each electrode and the number of electrodes employed of course depending upon the number of longitudinal wires employed in the production of the wire meshwork or fabric. One upper electrode bracket and one lower electrode bracket and parts associated therewith will be described, it being understood that these are typical of all of the upper and lower brackets and associated parts employed in the machine.

Secured to the upper cross rail 3 by means of angle pieces 7 and studs 8 is a base plate 9 provided at its lower end with projecting apertured ears 10 to receive the pivot pin 11 upon which is pivotally mounted the upper electrode bracket 12. This bracket 12 has secured thereto by means of studs 13 an electrode carrying yoke or member 14 the arms of which are apertured at the forward portions thereof to receive the pivot pin 15 upon which the electrode 16 is mounted between said arms. The electrode carrying yoke 14 is separated from the electrode bracket 12 by interposed insulating material 17, the studs 13 also being suitably insulated from the electrode bracket.

The electrode bracket 12 is capable of a limited pivotal movement about the pivot pin 11, being normally held away from the base plate 9 by means of a spring 18 mounted in recesses in the upper ends of electrode 12 and base plate 9 and the tension of which is adjustable by means of a screw 19. The extent of movement of the electrode bracket away from the base plate 9 is determined by a nut 20 adjustable on a bolt 21 threaded into the base plate 9, this nut determining the normal or lowermost position of the electrode 16. It will be seen that with this arrangement the electrode 16 is normally held in its lowermost position as indicated in the drawings but is capable of a limited upward movement against the action of the spring 18 which exerts a yielding pressure upon the electrode during such upward movement.

The electrode 16 at the upper end thereof is connected to a spring 22 the other end of which is adjustably connected to the forward end of an arm or bar 23 which is mounted upon a cross beam 24 which is suitably supported at its ends by the framework of the machine. The other end of the arm or bar 23 carries a screw 25 having an insulating head 26 against which the upper part of the electrode is normally held by the spring 22. The electrode is normally held by the spring 22 in the substantially upright position indicated in the drawings but it is capable of a pivotal or swinging movement in a clockwise direction about the pivot pin 15, for the purpose hereinafter mentioned, the spring serving to return the electrode to normal position in contact with the head 26 after each such pivotal or swinging movement. The electrode is preferably provided with a renewable shoe or wearing piece 27.

Each of the lower electrode brackets 28 is directly secured to the lower cross rail 4 by means of angle pieces 29 and studs 30 and the bracket has secured to the forward portion thereof by means of the studs 31 an electrode carrying yoke or member 32 which has pivotally mounted between the apertured forward ends of the arms thereof upon the pivot pin 33 the lower electrode 34. As will be seen from the drawings, the upper and lower carrying yokes 14, 32 and electrodes 16, 34 are similar in construction although reversely arranged, the electrodes extending toward each other and being spaced apart somewhat at their adjacent ends. The electrode 34 is also preferably provided with a renewable shoe or wearing piece 35. The lower electrode carrying yoke 32 is separated from the lower electrode bracket 28 by the insulating material 34ª, the studs 31 also being suitably insulated from the electrode bracket. It will be noted that in the construction described the lower electrode bracket 28 is fixedly secured to the lower cross rail 4, while the upper electrode bracket 12 is pivotally associated with the upper cross rail 3. This provides for a relative yielding movement of the electrodes away from and toward each other.

The lower electrode 34 is pivotally or swingingly movable upon the carrying yoke 32 in a manner similar to that described with reference to the upper electrode 16, the spring 37 normally holding the electrode against the insulating head 38 of the screw 39 carried by the arm or bar 40 to which the end of the spring 37 is adjustably connected and which is carried by the cross beam 41 similar to the cross beam 17 and also suitably supported by the framework of the machine.

Two series of transformers are provided, namely, an upper series one of which is indicated at 42 in Fig. 1 and a lower series one of which is indicated at 43 in the same figure. Each of the secondaries 44 of the upper series of transformers is connected at one end to a lug 46 of one of the upper electrode carrying yokes 14, and is connected at its other end to the lug 46 of an adjacent yoke 14. The secondary 45 of the corresponding lower transformer 43 is similarly connected at its two ends to the lugs 47 of the lower yokes 32 immediately beneath the yokes 14 to which the corresponding secondary 44 is connected, so that each pair of upper and lower transformer secondaries and their connections form a series circuit through the upper and lower carrying yokes 14, 32 and electrodes 16, 34, of two welding units, the circuit being open only between the two pairs of upper and lower electrodes. These open places are closed as the cross wires and longitudinal wires pass between the electrodes so as to complete the circuit. The primary circuit of the transformers may be left closed permanently or it may be connected with a contact switch operated from one of the shafts of the machine so that the primary circuit is closed and opened at the proper times.

The cross wires 48 which are to be welded to the longitudinal wires 49 are carried between the electrodes 16 and 34 by means of the chains 50, the links of which are provided with lugs or projections 51 which engage behind the cross wires 48 to carry the wires forwardly with the chains. These chains are supported upon sprocket wheels 52, 53 secured upon cross shafts 54, 55, the former of which is supported in bearings carried by the side frames 2 and the latter of which is carried in bearings on the side frames 56 mounted on the base 1 at the left-hand end thereof (see Fig. 1ª). It will be understood that when one or more cross wires have been welded to the longitudinal wires 49 and the cross wire or wires are advanced by the chains 50 the longitudinal wires will also be fed forwardly so that the chains 50 constitute a common means for advancing or forwarding both the cross wires 48 and the longitudinal wires 49.

The longitudinal wires may be led into and through the machine up to the welding zone through suitably supported pipes (not shown) being first fed in by hand from suitably supported coils. As the end of each coil of wire is reached, the end of a new coil of wire is butt-welded to it, so that after first starting up, the operation is continuous.

The shaft 55 also has secured thereto another series of sprockets 57 around which pass the chains 58 which also pass around the sprocket wheels 59 secured on the shaft 60 supported in bearings 61 on the side frames 56, the chains 58 and 50 both travelling at the same speed. If preferred, the sprockets 57 may be loosely mounted on the shaft 55 and this shaft be driven by sprockets and a chain from shaft 60 at the proper speed to give the chains 50 the same speed of travel as the chains 58.

The shaft 60 is driven by means of a worm wheel 62 thereon meshing with a worm 63 secured to a shaft 64 which is supported in bearings 65 on the side frames 56 and 2 and is driven from a suitable source of power, for example, by means of a belt passing over a pulley 66 secured to said shaft.

The cross wires 48 are released from the magazines 67 containing such wires by means of a suitable releasing mechanism actuated from a shaft 69 mounted in suitable bearings 70 on the frame work 71. This shaft 69 is driven by means of a sprocket chain 72 passing over a sprocket 73 on the shaft and over a sprocket 74 on a shaft 75 and also over an idler sprocket 76 mounted on a stud 77. The shaft 75 is supported in bearings 78 upon brackets 79 one at each side of the machine, one of these brackets also having bearings 80 for the end of the driving shaft 64. Secured to this shaft between the bearings 80 is a worm 81 which meshes with a worm wheel 82 secured to the shaft 75 whereby this shaft is driven and through the sprocket chain 72 and sprockets 74, 73 drives the shaft 69 of the releasing mechanism. The bracket 79 also has an extension 83 upon which is slidably supported a plate 84 carrying the stud 77 of the idler sprocket 76, this plate being adjustable by means of the screw 85 whereby the chain 72 can be kept free from excess lost motion.

The cross wires 48 are delivered from the magazines 67 on to chains 86 which are similar to the chains 50 and pass over sprockets 87 on the shaft 54, the cross wires being delivered by the chains 86 on the chains 50. The chains 86 also pass around other sprockets (not shown) on a shaft suitably supported by the framework 71.

The magazines are formed by the vertical slots 67 between the upright housings 68 of the magazines. The wires are fed to the magazines from straightening and cutting machines of any suitable kind, the proper lengths of wire after being straightened and cut off falling into the magazine slots and accumulating therein as indicated in Fig. 1.

The mechanism for releasing the wires from the magazines comprises for each magazine a cylinder or disk 94 having slots 95 in the periphery thereof, the cylinder or disk being mounted on a shaft 96 so that as the same rotates the wires drop by gravity into the notches 95 and are carried around by the cylinder or disks along the guide 97 and finally dropped one by one upon the chains 86 thereunder. The shafts 96 are rotated by means of bevel gears 98 thereon meshing with bevel pinions 99 on a shaft 100 mounted in suitable bearings 101 on the framework 71, which shaft is connected by bevel gears 102 with the aforesaid shaft 69, to be rotated thereby.

The bevel pinions 99 are preferably freely rotatable on the shaft 100, but are restrained from lengthwise movement relatively to said shaft, and they are formed or connected with clutch members 103 with which are adapted to be engaged clutch members 104 connected to rotate with the shaft 100 but slidable therealong into and out of engagement with the clutch members 103 by means of a suitable lever 105 pivoted at 106 upon the framework 71.

It is preferred to provide a plurality of magazines 67 to provide sufficient capacity and to provide against interruptions through exhaustion of a magazine or through failure of a straightening machine. Ordinarily, only one magazine will be drawn from at a time, the lever 105 of that magazine being operated to engage its clutch member 104 with the associated clutch member 103 to effect rotation of the cylinder or disk 94 while the levers 105 of the remaining magazines will be operated to disengage their clutch members 104. In the event that the supply of this magazine becomes low or if the associated straightening machine should fail to operate, the lever of another magazine will be operated to effect the release of the wires from that magazine, while the lever of the exhausted magazine will be moved to stop the rotation of the corresponding cylinder or disk 94 thus providing for a continuous release of cross wires from one or another of the magazines onto the conveying chains 86.

It will be understood that the specific construction of the magazines 67 and of the releasing mechanism for releasing the wires 58 from these magazines do not per se form any part of the present invention, and for a more complete description thereof reference may be made to co-pending application Serial No. 560,177, filed May 11, 1922, patented September 9, 1924, No. 1,508,313.

When a contact switch is employed to control the primary circuit of the transformers this switch may be operated from the shaft 75 or better still, from the releasing mechanism operated by the shaft 69 so that the primary circuit will be closed when a cross wire 48 is in position between the electrodes 16 and 34.

It is preferred to provide guides 88, 89 between adjacent pairs of electrodes between which guides the cross wires pass as they are carried between the electrodes, the uppermost guide 89 being carried by screws 90 from a bar 91 and being yieldingly pressed by springs 92 toward the guide 88. This ensures the proper vertical location of each cross wire at the commencement of the welding operation. The guides 88 and the bars 91 are carried by cross beams 93 suitably supported by the framework of the machine.

These guides and bars are omitted for the sake of clearness in Fig. 2, but it will be understood that they are sufficiently narrow as to permit each set of bars and guides to be positioned between a pair of electrodes and an adjacent chain 50 without interfering with the operation thereof. If desired additional guides 89ª may be secured to the upper cross beam 93 in advance of and in line with the upper electrodes and between the guides 89.

In the operation of the machine, the driving shaft 64 drives the shaft 60 which operates the chains 58 and drives the shaft 55 which operates the chains 50 which in turn rotate the shaft 54 which operates the chains 36. The shaft 64 also drives the shaft 75 which through chain 72 drives the shaft 69 which operates the releasing mechanism to release the cross wires 48 from the magazines 67. The cross wires are delivered on to the chains 86 and they pass therefrom onto the chains 50 which carry the cross wires in succession through the welding zone, between the upper and lower electrodes 16 and 34. During their passage through the welding zone, the cross wires are supported by the guides 88 and by the longitudinal wires 49 which latter engage and are supported by the lower electrodes, the two sets of wires wedging between the electrodes, as they are fed forward. As already described, the chains 50 also serve to advance or feed forward the longitudinal wires 49.

If the primary circuit of the transformers is not at all times closed but is controlled by a circuit breaker actuated from the shaft 75 or from the releasing mechanism, this circuit breaker will be timed to close at the instant a cross wire 48 reaches a position in which it is just between the entering sides of the electrodes 16 or 34 at which time the secondary circuit is also finally completed through the electrodes. This causes a current to flow through the electrodes and through the cross wire and longitudinal wires, heating said wires to the welding point. The chains 50 carry the cross wire and longitudinal wires forwardly and during this movement the electrodes spread apart due to the yielding of the upper electrode against the action of the spring 18, the upper electrode bracket 12 pivoting about the pivot pin and the spring 18 exerting a downward pressure on the electrode 16 which pressure causes the wires to weld together when the proper temperature is reached. During this movement of the crossed wires also the electrodes 16 and 34 by the movement of the wires are caused to rock on the pivot pins 15 and 33 until the cross wire reaches a point substantially on a line joining the centers of the pivots 15 and 33 at which time the pressure will begin to decrease until the wire is released entirely from between the electrodes and the latter return to their original normal positions under the influence of the springs 22 and 37. If a circuit breaker is employed in the primary circuit of the transformers it will be opened at about the time the wire passes the line joining the centers of the pivots 15 and 33. It will thus be seen that during the welding operation the electrodes move with the cross wire being welded to the longitudinal wires and that a pressure is maintained on the cross wire by the action of the spring 18 upon the upper electrodes during the welding operation.

If the cross wires 48 and longitudinal wires 49 successively engaged the electrodes 16, 34 at the same point in the surfaces thereof very rapid wear of the electrodes at this point would result. To avoid this it may be desirable to slowly move the cross beams 24 and 41 backwardly and forwardly toward and away from the pivots 15 and 33 by which movement the electrodes are slowly swung about the pivots 15 and 33 with the result that the wires successively engage at different points in the surfaces of the electrodes. The movement of the cross beams 24 and 41 may be effected by the mechanism which is shown in Figures 2 and 3 of the drawings.

As shown particularly in Figure 3 the cross beams 24, 41 are each supported at each end thereof within a housing 107 carried by a vertical standard 108 mounted upon the base plate 1. Only one of these standards is shown in Figures 2 and 3 of the drawings, but it will be understood that a housing is located at each side of the machine so that both ends of both cross beams are properly supported. Each housing is provided with upper and lower supporting and guiding surfaces 109 with which engage bearing blocks 110 carried by the corresponding cross beam, whereby this beam is supported and guided for reciprocating sliding movement. Each cross beam carries at each end thereof a bracket 111 to which is pivotally connected by a pin 112 a link 113 pivotally connected at its other end to a crank pin 114 carried by a crank disk 115 on a shaft 116 supported in suitable bearings in the standard 108. The upper and lower shafts 116 at each side of the machine are connected for joint rotation by sprockets 117 thereon, and a chain 118 passing around these sprockets. The lower shaft 116 at each side of the machine is provided with another sprocket 119 around which passes a chain 120 also passing around a sprocket 121 on a shaft 122 extending transversely across the machine in order to simultaneously operate the two mechanisms at the opposite sides of the machine.

The shaft 122 is mounted in bearings 123 in a bracket 124 at each side of the machine mounted upon the base plate 1, the bracket 124 at one side of the machine also having bearings 125 for the shaft 64 before referred to. Mounted on this shaft 64 is a worm 126 which meshes with a worm wheel 127 secured to the shaft 122. It will thus be seen that when shaft 64 is rotating it will rotate shaft 122 and through chains 120 and 118 the shafts 116 will be synchronously rotated and through the connections described these shafts will impart a slow reciprocation to the cross beams 24, 41 toward and away from the pivots 15 and 33, for the purpose mentioned. The crank pins 114 are adjustably mounted within undercut slots 128 in the crank disks 115, whereby the throw of the cranks and the extent of reciprocation of the cross beams may be adjusted as desired.

The standards 108 may be braced from the side brackets 2 by means of beams 129 connected with said brackets by smaller brackets 131 mounted on the upper ends of the brackets 2 and to which the beams 129 are connected by angle irons 132. These beams may be braced by a transverse beam 130, and are supported from the base 1 by means of columns 133.

Means may be provided for adjusting the relative heights of the cross-rails 3 and 4 upon the brackets 2 to vary the relative positions of the electrodes to take care of different diameters of wires and to bring the electrodes closer together when the surfaces of the shoes 27 and 35 have been dressed off. One form of such means is shown in Figure 3. For the cross-rail 4 a stud 134 is threaded into the base 1 and locked by means of a nut 135. The head of the stud engages the lower side of the cross rail and adjustment of the stud raises or lowers said rail. For the cross-rail 3 a stud 136 is threaded tightly into the upper part of the cross rail and passes through a clearance hole in the bracket 131. A nut 137 is threaded on the stud above the bracket and this nut is turned to raise or lower the rail, after first releasing the clamping studs 6 securing the rail to the standards 2.

It will be understood that the invention is not restricted to the particular details of construction illustrated in the accompanying drawings, the particular form of machine being merely illustrative of the features of the invention. The details of construction of the various parts may be variously modified without departing from the spirit and scope of the invention.

What I claim and desire to secure by Letters Patent is:

1. In a machine of the kind described, in combination, a common feeding means operative to effect both the feeding of a series of longitudinal wires and the feeding of a succession of individual cross wires, prior to the welding thereof to said longitudinal wires, means for operating said feeding means, and welding means operative to weld the cross wires to the longitudinal wires at the points of intersection thereof.

2. In a machine of the kind described, in combination, welding means operative to weld together a series of longitudinal wires and a succession of cross wires at their points of intersection, and single feeding mechanism operative upon said cross wires to effect feeding movement thereof both before and after the operation of welding the same to the longitudinal wires.

3. In a machine of the kind described, in combination, a common feeding means operative to effect a continuous feeding movement of both a series of longitudinal wires and a succession of individual cross wires prior to the welding operation, means for operating said feeding means, and welding means operative during said feeding movement to weld the cross wires to the longitudinal wires at the points of intersection thereof.

4. In a machine of the kind described, in combination, welding means operative to weld a succession of cross-wires to a series of longitudinal wires at the points of intersection thereof, a common feeding means operative to feed the cross-wires in properly spaced relation to said welding means, and also operative to feed the cross-wires and longitudinal wires after being welded together, and means for operating said feeding means.

5. In a machine of the kind described, in combination, welding means operative to weld a succession of cross-wires to a series of longitudinal wires at the points of intersection thereof, a feeding mechanism operative to effect the feeding of the cross-wires in properly spaced relation to said welding means and during the welding operation and following said welding operation, and means for operating said feeding mechanism.

6. In a machine of the kind described, in combination, welding means operative to weld a succession of cross-wires to a series of longitudinal wires at the points of intersection thereof, and a feeding mechanism for said cross-wires traveling through the machine and having feeding engagement with said cross-wires from a point in advance of said welding means to a point beyond said welding means.

7. In a machine of the kind described, in combination, welding means operative to weld a succession of cross-wires to a series of longitudinal wires at the points of intersection thereof, and endless feeding chains engaging said cross-wires to feed the same through the machine in properly spaced relation from a point in advance of said welding means to a point beyond said welding means.

8. In a machine of the kind described, in combination, means for effecting feeding movement of crossed-wires to be welded, welding electrodes, and supporting means by which said electrodes are positioned to engage said crossed-wires, said electrodes being pivotally mounted in said supporting means and being movable about their pivotal axes in the direction of the feeding movement of said wires during the welding operation by the engagement of the wires therewith.

9. In a machine of the kind described, in combination, means for effecting feeding movement of crossed-wires to be welded, welding electrodes, and supporting means by which said electrodes are positioned to engage said crossed-wires, said electrodes being pivotally mounted in said supporting means and being arranged to be moved about their pivotal axes in the direction of the feeding movement of said wires during the welding operation by the engagement of the wires therewith and then to return to initial position.

10. In a machine of the kind described, in combination, means for effecting feeding movement of crossed-wires to be welded, welding electrodes, and means supporting said electrodes in position to engage said crossed-wires, said electrodes being supported by said supporting means to travel with said wires during the welding operation, the travel of the electrodes being effected by the feeding movement of said wires.

11. In a machine of the kind described, in combination, means for effecting feeding movement of crossed-wires to be welded, welding electrodes, and means supporting said electrodes in position to engage said crossed-wires, said electrodes being supported by said supporting means so as to be movable by said wires in the direction of the feeding movement thereof during the welding operation, and for reverse movement into initial position after the welding operation.

12. In a machine of the kind described, in combination, means for effecting feeding movement of crossed-wires to be welded, welding electrodes, means supporting said electrodes and positioning the same to engage said crossed-wires as the wires are fed to said electrodes, said electrodes being mounted in said supporting means to travel with said wires during the welding operation, and resilient means tending to return said electrodes into initial position.

13. In a machine of the kind described, in combination, means for effecting feeding movement of the crossed wires to be welded, welding electrodes, and means supporting said electrodes in position to engage said crossed-wires, said electrodes being swingingly mounted in said supporting means to swing with said wires in the direction of movement thereof during the welding operation, and then to return to initial position.

14. In a machine of the kind described, in combination, means for effecting feeding movement of crossed-wires to be welded, welding electrodes, means supporting said electrodes, and means normally yieldingly holding said electrodes in position to be engaged by said crossed-wires as said wires are fed to said electrodes, said electrodes being reciprocably mounted to travel with said wires for a certain distance while the wires are being welded, and then to return to their original positions.

15. In a machine of the kind described, in combination, means for effecting feeding movement of crossed wires to be welded, and welding electrodes normally held by resilient means in position to be engaged by said crossed wires as said wires are fed to said electrodes and to be moved thereby in the direction of the feeding movement thereof during the welding operation.

16. In a machine of the kind described, in combination, means for effecting feeding movement of crossed-wires to be welded, pivoted welding electrodes, means pivotally supporting said electrodes in position to engage said crossed-wires, said electrodes being mounted to swing forwardly about their pivotal axes with said wires during the welding operation and then to swing back to normal positions and resilient means operative to hold the electrodes in engagement with the crossed-wires during the welding operation.

17. In a machine of the kind described, in combination, means for effecting feeding movement of crossed-wires to be welded, welding electrodes, positioned at opposite sides of the path of travel of said wires, supporting means at opposite sides of said path for supporting the respective electrodes, and said electrodes being reciprocably mounted to travel with said wires during the welding operation and then to return to normal positions, and means operative to yieldingly press the electrodes at one side of said path toward the other electrodes, and to hold said electrodes in such relative normal positions that they will be engaged by the crossed-wires as said wires are fed between said electrodes.

18. In a machine of the kind described, in combination, means for feeding crossed wires to be welded, electrode carrying means, welding electrodes swingingly supported by said carrying means for swinging movement in the direction of travel of said wires, means pivotally supporting said carrying means, and resilient means operating on said carrying means to hold said electrodes in yielding engagement with said crossed wires.

19. In a machine of the kind described, in combination, means for feeding crossed wires to be welded, electrode carrying means at opposite sides of the path of travel of said wires, welding electrodes swingingly supported by said carrying means for swinging movement in the direction of travel of said wires, means pivotally supporting the carrying means at one side of said path of travel, and resilient means operating on said carrying means to hold said electrodes in yielding engagement with said crossed wires.

20. In a machine of the kind described, in combination, means for effecting feeding movement of crossed wires to be welded, welding electrode positioned to engage said crossed wires and mounted to travel with said wires during the welding operation, and means operative to effect reciprocation of said electrodes in the direction of the travel of the wires and in the reverse direction to distribute the wear on the electrodes.

21. In a machine of the kind described, in combination, a common means operative to effect both the feeding of a series of longitudinal wires and the feeding of a succession of cross wires, welding means operative to weld the cross wires to the longitudinal wires at the points of intersection thereof, and means operative to move the electrodes in the direction of travel of the wires to distribute the wear on the electrodes.

22. In a machine of the kind described, in combination, means for effecting feeding movement of crossed wires to be welded, welding electrodes positioned to engage said crossed wires and mounted to travel with said wires during the welding operation, and means operative to move the electrodes in the direction of travel of the wires to distribute the wear on the electrodes.

23. In a machine of the kind described, in combination, means for effecting the feeding movement of crossed-wires to be welded, welding electrodes, means supporting said electrodes in position to engage said crossed-wires, said electrodes being mounted to travel with said wires during the welding operation, and means for giving said electrodes a constant reciprocating motion independent of their travel with said wires.

24. In a machine of the kind described, in combination, welding means operative to weld a succession of cross-wires to a series of longitudinal wires at the points of intersection thereof, a magazine for holding a plurality of cross-wires, means operative to release wires one at a time from said magazine, and conveying means to which said cross-wires are delivered by said releasing means, said conveying means being arranged to feed the individual cross-wires to the welding means and during the welding operation and also adapted by engagement with said cross-wires after the welding operation to effect feeding of said longitudinal wires.

25. In a machine of the kind described, in combination, conveying means for feeding cross-wires and longitudinal wires to be welded, welding electrodes, means supporting said electrodes in position to engage said wires, said electrodes being mounted for movement with said wires and for reciprocating movement independently thereof, a magazine for holding a plurality of cross-wires, and means for releasing said cross-wires one at a time from said magazine and delivering the same to said conveying means.

26. In a machine of the kind described, in combination, welding means operative to weld a succession of cross-wires to a series of longitudinal wires at the points of intersection thereof, a magazine for holding a plurality of cross-wires, means operative to release wires one at a time from said magazine, and conveying means to which said cross-wires are delivered by said releasing means, said conveying means being arranged to feed the individual cross-wires to said welding means and during the welding operation, and also adapted by engagement with said cross-wires after the welding operation to effect feeding of said longitudinal wires, and a common means for operating said conveying means and said releasing means in synchronism.

27. In a machine of the kind described, in combination, welding means operative to weld a succession of cross-wires to a series of longitudinal wires at the points of intersection thereof, a magazine for holding a plurality of cross-wires, means for releasing wires one at a time from said magazine, and conveying means to which said cross-wires are delivered by said releasing means, said conveying means being arranged to feed the individual cross-wires to said welding means and during the welding operation, and also adapted by engagement with said cross-wires after the welding operation to effect feeding of said longitudinal wires, means for effecting reciprocation of said electrodes in the direction of travel of said wires, and a common means for operating said conveying means, said releasing means, and said reciprocating means in synchronism.

28. In a machine of the kind described, in combination, means for effecting feeding movement of the cross wires to be welded, welding electrodes positioned to engage said cross wires and mounted for reciprocating movement, transversely arranged beams arranged to co-act with said electrodes, means at opposite sides of the machine supporting said beams for reciprocating movement, and means for effecting reciprocation of said cross beams toward and from said electrodes to cause reciprocation of the latter.

29. In a machine of the kind described, in combination, means for effecting feeding movement of the cross wires to be welded, pivotally mounted electrodes positioned to engage said cross wires, transversely arranged beams arranged to co-act with said electrodes, means at opposite sides of the machine supporting said beams for recipocating movement, and means for effecting reciprocation of said cross beams toward and from said electrodes to cause oscillation of the latter.

30. In a machine of the kind described, in combinaton, means for effecting feeding movement of the cross wires to be welded, welding electrodes positioned to engage said cross wires and mounted for reciprocating movement, transversely arranged beams arranged to co-act with said electrodes, housings at opposite sides of the machine supporting said trasverse beams for sliding movement toward and away from said electrodes, and means for effecting reciprocation of said cross beams toward and from said electrodes to cause reciprocation of the latter.

31. In a machine of the kind described, in combinaton, means for effecting feeding movement of the cross wires to be welded, welding electrodes positioned to engage said cross wires and mounted for reciprocating movement transversely arranged beams arranged to co-act with said electrodes, means at opposite sides of the machine supporting said beams for reciprocating movement, and means for effecting recipocation of said cross beams toward and from said electrodes to cause reciprocation of the latter, said means including rotatable crank devices connected to opposite ends of said beams.

32. In a machine of the kind described, in combination, means for effecting feeding movement of crossed-wires to be welded, welding electrodes, means supporting said electrodes in position to engage said crossed-wires, said electrodes being mounted for reciprocating movement to travel with said wires during the welding operation and then to return to initial position, and resilient means for causing the electrodes to exert welding pressure upon the wires during the heating operation.

33. In a machine of the kind described, in combination, means for effecting feeding movement of the crossed wires to be welded, welding electrodes, means supporting said electrodes in position to engage said crossed-wires, said electrodes being mounted for reciprocating movement to travel with said wires during the welding operation and then to return to initial position, and means for moving said electrodes toward or away from each other to vary the relative positions thereof.

Signed at Youngstown in the county of Mahoning and State of Ohio this 28th day of June A. D. 1922.

THOMAS HENRY KANE.